United States Patent Office 3,808,191
Patented Apr. 30, 1974

3,808,191
AMINO ACID AND PEPTIDE COMPOUNDS WITH JUVENILE HORMONE ACTIVITY
Karel Poduska, Milan Zaoral, Karel Slama, and Frantisek Sorm, Prague, Czechoslovakia, assignors to Ceskoslovenska Akademie Ved, Prague, Czechoslovakia
No Drawing. Filed Sept. 22, 1971, Ser. No. 182,827
Int. Cl. C07c *103/20, 103/52;* C07d *29/30*
U.S. Cl. 260—112.5                5 Claims

ABSTRACT OF THE DISCLOSURE

Novel substances containing amino acid residue which exhibit high juvenile hormone activity.

---

The present invention relates to novel compounds having juvenile hormone activity and preparation thereof.

Almost all the hitherto known substances of juvenile hormone activity represented from the chemical standpoint aliphatic sesquiterpenes or aliphatic monoterpenes attached to para-substituted aromatic or alicyclic ring systems. There are few exceptions from this type, e.g., dodecyl methyl ether and substances derived from insecticidal synergists of the piperonyl butoxide or sesamex type.

Application of substances of the above type to certain developmental stages causes deformations in insect development resulting in death or inability of a further reproduction due to sterility of eggs. Owing to their activity, these substances are considered as a novel type of insect pesticides of the so-called third generation.

We have discovered that substances consisting of two or more amino acid residues exhibit a high and specific juvenile hormone activity.

The present invention relates to novel insect pesticides of juvenile hormone activity wherein the active substance is represented by amino acid and peptide derivatives according to the general type I $$A\text{---}B\text{---}C \quad (I)$$

wherein the part A is (a) a residue of the half-ester of carbonic acid according to the General Formula I'

$$\begin{array}{c} R\text{---}X\text{---}C=O \\ | \end{array} \quad (I')$$

wherein the symbol R designates a branched alkyl group consisting of 3 to 6 carbon atoms and the symbol X represents an atom of oxygen of sulfur, or (b) A residue of a fatty acid according to Formula I"

$$\begin{array}{c} R\text{---}C=O \\ | \end{array} \quad (I'')$$

wherein R designates the same as above, or (c) A residue of substituted fatty acid of Formula I'''

$$\begin{array}{c} R\text{---}X'\text{---}C=O \\ | \end{array} \quad (I''')$$

wherein R designates the same as above and X' is a $$\begin{array}{ccc} CH, & CH \text{ or } & CH \\ | & | & | \\ NH_2 & Cl & Br \end{array}$$

fragment, the part A being attached through the carbonyl group carbon atom to the nitrogen atom of part B which consists of (a) A residue of an amino acid possessing the L or DL configuration, according to Formula II $$\begin{array}{ccc} R^1 & R^2 & O \\ | & | & \| \\ \text{---}N\text{---}(CH_2)_n\text{---}CH\text{---}C\text{---} \end{array} \quad (II)$$

wherein $R^1$ is a hydrogen atom or methyl, $R^2$ is a branched or unbranched alkyl or benzyl, and $n$ is zero or one, or (b) A residue of a cyclic imino acid possessing the L or DL configuration, according to Formula II'

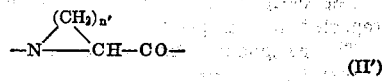
(II')

wherein $n'$ is 2, 3, or 4, the part B being attached through the carbonyl group carbon atom to the nitrogen atom of part C which is represented by aniline derivatives (a) According to Formula III

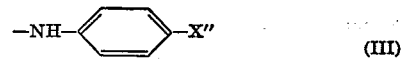
(III)

wherein X" is COOH, COOCH$_3$, COOC$_2$H$_5$, COOC(CH$_3$)$_3$, CON(CH$_3$)$_2$, CON(C$_2$H$_5$)$_2$, NO$_2$, SO$_2$NH$_2$, OCH$_3$, OC$_2$H$_5$, CH$_3$, C$_2$H$_5$ group or halogen, or (b) According to the General Formula III'

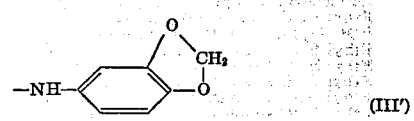
(III')

The present invention comprises also a process of preparing the above-mentioned novel pesticides of insect juvenile hormone activity, which process consists in connection of two neighboring components of the triad A—B—C by methods known in the synthesis of amides or urethans, followed by attachment of the remaining third component. Connection of two neighboring components and attachment of the third component may be accomplished by known methods.

All compounds according to the present invention belong to juvenile hormone analogues exhibiting highly selective effects. They are particularly active on hemiptera from the group of Pyrrhocoridae, inter alia on Dysdercus species, i.e., cotton pests occurring on the American continent, in Africa, and in Asia. Substances carrying the methylendioxyphenyl group are active in a considerably wide concentration range. Due to the high selectivity, the novel substances can be used against certain pests without affecting the parasites and predators or without considerably affecting the insect biocenosis.

BIOLOGICAL ACTIVITY

The juvenile hormone activity was tested on freshly molted last instar larvae of hemiptera (*Pyrrhocoris apterus*), *Dysdercus cingulatus* (Pyrrhocoridae), *Graphosoma italicum* (Pentatomidae), and freshly molded pupae of *Tenebrio molitor* (Tenebriomidae). The test substances were applied to the insect body surface topically on the injured cuticle in a standard 1 microliter drop of an acetone solution containing a small amount of olive oil or exclusively in acetone. In some cases, the test substances were dissolved or emulsified in olive oil and injected in standard 1 microliter drop into the body of pupae (Tenebrio).

The activity was evaluated on the basis of inhibition of metamorphosis. The activity is expressed in activity units which designate that amount of the test substance in micrograms per specimen causing the formation of half-larval (with hemiptera) or half-pupal (with Tenebrio) adultoids under the test conditions stated. Assays on the sterilization effects were performed by a similar technique except for the application to the male imago and evaluation on the basis of percentage of sterile eggs. For the juvenile homone activity of some novel substances according to the present invention see the following table.

In the table, the following abbreviation are used:

In.=no juvenile activity in doses of 500 micrograms per specimen

BOC=tert-butyloxycarbonyl
>=the activity unit is higher than the amount stated
<=the activity unit is lower than the amount stated.

The present invention is illustrated but not limited by the following Examples 1–21.

The designation "method A" relates to the procedure reported in Example 4.

The designation "method B" relates to the procedure reported in Example 5.

TABLE

[Juvenile hormone activity units of test substances expressed in micrograms per specimen causing the formation of half-larval or half-pupal adultoids]

| Insect | Pyrrhocoridae | | Pentatomidae | Tenebrionidae | |
|---|---|---|---|---|---|
| Species | $Pyrrhocoris$ $apterus$ | $Dysdercus$ $cingulatus$ | $Graphosoma$ $italicum$ | $Tenebrio\ molitor$ | |
| Application | Topical | Topical | Topical | Topical | Injection |
| Stage | Larvae (5) | Larvae (5) | Larvae (5) | Pupae | Pupae |
| Test substances: | | | | | |
| Ethyl L-isoleucyl-L-alanyl-p-aminobenzoate (I) | 0.1 | 0.5 In. | | | In. |
| Ethyl chloroisovaleryl-L-alanyl-p-aminobenzoate (II) | 0.5 | 0.1 In. | | | In. |
| L-isoleucyl-L-alanyl-3,4-methylenedioxyaniline (III) | 100 | 100 In. | | | 500 |
| Ethyl BOC-L-prolyl-p-aminobenzoate (IV) | 0.1 | 0.08 In. | | | In. |
| BOC-L-prolyl-p-methoxyaniline (V) | >100 | >100 In. | | | In. |
| Ethyl BOC-L-alanyl-p-aminobenzoate (VI) | 0.1 | 0.5 In. | In. | | |
| Ethyl BOC-D-alanyl-p-aminobenzoate (VII) | 300 | 500 In. | In. | | In. |
| Ethyl BOC-DL-α-aminobutyryl-p-aminobenzoate (VIII) | 0.05 | 0.01 In. | In. | | |
| Ethyl BOC-DL-β-aminobutyryl-p-aminobenzoate (IX) | 0.1 | 5 In. | In. | | |
| Ethyl BOC-L-isoleucyl-p-aminobenzoate (X) | 0.1 | 0.05 In. | In. | | |
| Ethyl BOC-glycy-lp-aminobenzoate (XI) | 500 | 500 In. | In. | | |
| BOC-L-alanyl-p-nitroaniline (XII) | 100 | 100 In. | In. | | |
| BOC-L-alanylsulfanilamide (XIII) | 100 | 100 In. | In. | | |
| Ethyl pivaloyl-L-alanyl-p-aminobenzoate (XIV) | <0.1 | <0.05 | | | |

EXAMPLE 1

Ethyl L-isoleucyl-L-alanyl-p-aminobenzoate (I)

Dicyclohexylcarbodiimide (2.06 g.) in ethyl acetate (5 ml.) is added at 0° C. to a solution of benzyloxycarbonyl-L-alanine (2.23 g.) and ethyl p-aminobenzoate (1.08 g.) in ethyl acetate (10 ml.). After 1 hour at 0° C. and 20 hours at room temperature, the precipitate of dicyclohexylurea is filtered off and the filtrate evaporated to dryness under diminished pressure. Yield of the crystalline product, 3.22 g. (87%). The residue is treated with 10 ml. of about 35% solution of hydrogen bromide in glacial acetic acid. After 10 minutes at room temperature, the solution is concentrated under diminished pressure and the concentrate is precipitated by the addition of dry ether (50 ml.). The crystalline precipitate of ethyl L-alanyl-p-aminobenzoate hydrobromide is collected with suction and dried. Yield, 2.56 g. (93%). This hydrobromide is dissolved in water (5 ml.) and the solution is made alkaline by the addition of a saturated aqueous solution of sodium hydrogen carbonate. The precipitate of ethyl L-alanyl-p-aminobenzoate is extracted with ethyl acetate (10 ml.), the extract is dried over anhydrous sodium sulfate, and treated with benzyloxycarbonyl-L-isoleucine (1.88 g.) and then under cooling (0° C.) with dicyclohexylcarbodiimide (1.66 g.) in ethyl acetate (3 ml.). The condensation and work-up of the reaction mixture is performed as above. Yield of the crystalline product, 3.16 g. (81%). The product is treated with 10 ml. of an about 35% solution of hydrogen bromide in glacial acetic acid, the mixture is allowed to stand at room temperature for 10 minutes, concentrated under diminished pressure, and the concentrate precipitated by the addition of dry ether (50 ml.) to afford amorphous ethyl L-isoleucyl-L-alanyl-p-aminobenzoate hydrobromide which is dried under diminished pressure over phosphorus pentoxide and potassium hydroxide. The dry hydrobromide is dissolved in water (5 ml.), the solution made alkaline by the addition of a saturated aqueous solution of sodium hydrogen carbonate, and the precipitate of ethyl L-isoleucyl-L-alanyl-p-aminobenzoate extracted with ethyl acetate (25 ml.). The extract is dried over anhydrous sodium sulfate, evaporated under diminished pressure, and the residue recrystallized from ethyl acetate-petroleum ether. Yield, 1.70 g. (74%), M.P. 161–162° C., $\alpha_D^{25}$ −69.2° (c.=2, methanol). For $C_{18}H_{27}N_3O_4$ (349.42) calculated: 61.87% C, 7.79% H, 12.03% N; found: 61.62% C, 7.88% H, 12.38% N.

EXAMPLE 2

Ethyl 2-chloro-3-methylvaleryl-L-alanyl-p-amino-benzoate (II)

Ethyl L-isoleucyl-L-alanyl-p-aminobenzoate (0.25 g.) is dissolved in concentrated hydrochloric acid (2 ml.). The solution is treated with an excess of sodium nitrite, the resulting oil extracted with ethyl acetate (25 ml.), the extract washed three times with water, dried over sodium sulfate, and evaporated to dryness under diminished pressure. Yield, 186 mg. (70%) of the sticky ethyl 2 - chloro - 3 - methylvaleryl-L-alanyl-p-aminobenzoate. Mass spectrum, peaks at 368, 350, 332, 323, 287, 263, 221, 204, 192, 176, 168, 165, 120, and 97.

EXAMPLE 3

L-isoleucyl-L-alanyl-3,4-methylenedioxyaniline (III)

Dicyclohexylcarbodiimide (2.06 g.) in dimethylformamide (3 ml.) is added at 0° C. to a solution of o-nitrophenylsulfenyl-L-alanine (1.42 g.) and 3,4-methylenedioxyaniline (1.37 g.) in dimethylformamide (5 ml.). After 1 hour at 0° C. and 20 hours at room temperature, the precipitate of dicyclohexylurea is filtered off and the filtrates are evaporated to dryness under diminished pressure. The residue is treated with a 5% solution of hydrogen chloride in methanol (15 ml.). After 10 minutes at room temperature, the solution is evaporated to dryness under diminished pressure. The residue is repeatedly triturated with anhydrous ether, dried under diminished pressure over phosphorus pentoxide and potassium hydroxide, and treated with an about 3% solution of ammonia in chloroform (20 ml.). The reaction mixture is shaken for 10 minutes, the precipitate of ammonium chloride filtered off, and the filtrate evaporated under diminished pressure. Yield of the sticky residue, 1.76 g. (84.5%). The residue is dissolved in dimethylformamide (5 ml.) and the solution is treated with o-nitrophenylsulphenyl-L-isoleucine (2.4 g.) in dimethylformamide (3 ml.) and then at 0° C. with dicyclohexylcarbodiimide (1.74 g.) in dimethylformamide (3 ml.). The condensation is performed as above. The dimethylformamide is evaporated, the residue repeatedly triturated with saturated aqueous sodium hydrogen carbonate, extracted with ethyl acetate (25 ml.), the extract dried over sodium sulfate, and evaporated under diminished pressure. The free base is prepared in a similar manner as stated above. Yield, 1.25 g. (46%) of sticky L-isoleucyl-L-alanyl-3,4-methylenedioxyaniline. Mass spectrum: 321, 290, 262, 208, 182, 157, 137, 100, 86 and 44,

EXAMPLE 4

Ethyl tert-butyloxycarbonyl-L-prolyl-p-amino-benzoate (IV)

Method "A."—A solution of ethyl p-aminobenzoate (1.65 g.) in dry pyridine (25 ml.) is treated at —20° C. with freshly distilled phosphorus trichloride (0.45 ml.) and the mixture is allowed to stand 30 minutes at —20° C. and 30 minutes at room temperature. The reaction mixture is then treated with tert.-butyloxycarbonyl-L-proline (2.15 g.), refluxed for 3 hours, cooled down, and filtered. The pyridine is evaporated under diminished pressure. After adding 5% aqueous sodium hydrogen carbonate, the oily residue solidifies immediately. The product is collected with suction and washed on the filter successively with water, 5% aqueous citric acid, water, 5% aqueous sodium hydrogen carbonate, and water again. Yield, 2.95 g.; M.P. 152–160° C. Recrystallization from aqueous ethanol afforded 2.65 g. of the purified product, M.P. 164–166° C.

EXAMPLE 5

Ethyl tert-butyloxycarbonyl-L-prolyl-p-amino-benzoate (IV)

Method "B."—1-hydroxybenzotraizol (1.5 g.) and dicyclohexylcarbodiimide (2.3 g.) are added at —7° C. to a solution of tert-butyloxycarbonyl-L-proline (2.15 g.) in dimethylformamide (10 ml.) and the mixture is allowed to stand for one hour at —7° C. and one hour at room temperature. Ethyl p-aminobenzoate (1.65 g.) in dimethylformamide (5 ml.) is then added and the reaction mixture kept at 0° C. for 24 hours. The precipitate of dicyclohexylurea is filtered off and the filtrate is evaporated to dryness under diminished pressure. The oily residue is dissolved in ethyle acetate (50 ml.), the solution washed successively with 5% aqueous citric acid, water, 5% aqueous sodium hydrogen carbonate, and water, and dried over sodium sulfate. The ethyl acetate is evaporated under diminished pressure. By the addition of petroleum ether to the oily residue a rapid crystallization sets in. Recrystallization from aqueous ethanol affords 2.53 g. of the product, M.P. 163–165° C., undepressed on admixture with a specimen prepared by method "A."

EXAMPLE 6

Methyl tert-butyloxycarbonyl-L-prolyl-p-aminobenzoate

The title compound is prepared similarly to ethyl tert-butyloxycarbonyl - L - prolyl-p-aminobenzoate from tert-butyloxycarbonyl-L-proline and methyl p-aminobenzoate with the use of method "A," given in Example 4.

EXAMPLE 7

Tert-butyloxycarbonyl-L-prolyl-p-methoxyaniline (V)

The title compound is prepared similarly to ethyl tert-butyloxycarbonyl - L - prolyl-p-aminobenzoate from tert-butyloxycarbonyl-L-proline and p-methoxyaniline with the use of method "A," given in Example 4. Yield of the crude product, 78%; M. P. 150–154° C. Yield of the recrystallized product, 70%; M.P. 153–155° C. (aqueous ethanol).

EXAMPLE 8

Ethyl tert-butyloxycarbonyl-L-alanyl-p-amino-benzoate (VI)

The title compound is prepared similarly to ethyl tert-butyloxycarbonyl - L - prolyl-p-aminobenzoate from tert-butyloxycarbonyl-L-alanine and ethyl p-aminobenzoate with the use of method "B" given in Example 5. Yield of the crude product, 83%; M.P. 116–120° C. Yield of the recrystallized product, 71%; M.P. 126–128° C. (ethyl acetate-petroleum ether).

EXAMPLE 9

Ethyl tert-butyloxycarbonyl-D-alanyl-p-aminobenzoate (VII)

The title compound is prepared by a similar procedure as the L-alanine derivative with the use of tert-butyloxycarbonyl-D-alanine as the starting material. Yield of the crude product, 86%; M.P. 108–115° C. Yield of the recrystallized product, 70%; M.P. 125–127° C. (ethyl acetate-petroleum ether).

EXAMPLE 10

Ethyl tert-butyloxycarbonyl-DL-α-aminobutyryl-p-aminobenzoate (VIII)

The title compound is prepared by a similar procedure as ethyl tert-butyloxycarbonyl-L-prolyl-p-aminobenzoate from tert-butyloxycarrbonyl-DL-β-aminobutyric acid and ethyl-p-aminobenzoate with the use of Method "A" given in Example 4. Yield of the crude product, 60%. Yield of the recrystallized product, 40%; M.P. 156–158° C. (aqueous ethanol).

EXAMPLE 11

Ethyl tert-butyloxycarbonyl-DL-β-aminobutyryl-p-aminobenzoate (IX)

The title compound is prepared by a similar procedure as ethyl tert-butyloxycarbonyl-L-prolyl-p-aminobenzoate from tert-butyloxycarbonyl-DL-β-aminobutyric acid and ethyl p-aminobenzoate with the use of method "B" given in Example 5. The melting point of the product is 144–146° C. (aqueous ethanol).

EXAMPLE 12

Ethyl tert-butyloxycarbonyl-1-isoleucyl-p-amino-benzoate (X)

The title compound is prepared by a similar procedure as ethyl tert-butyloxycarbonyl-L-prolyl-p-aminobenzoate from tert-butyloxycarbonyl - L - isoleucine and ethyl p-aminobenzoate with the use of method "B" given in Example 5. The melting point of the product is 132–134° C. (aqueous ethanol).

EXAMPLE 13

Ethyl tert-butyloxycarbonylglycyl-p-aminobenzoate (XI)

The title compound is prepared by a similar procedure as ethyl tert-butyloxycarbonyl-L-prolyl-p-aminobenzoate from tert-butyloxycarbonylglycine and ethyl p-aminobenzoate with the use of method "B" given in Example 5. Yield of the crude product, 94%; M.P. 80° C. Yield of the recrystallized product, 70%; M.P. 79–81° C. (ethyl acetate-petroleum ether).

EXAMPLE 14

Tert-butyloxycarbonyl-L-alanyl-p-nitroaniline (XII)

The title compound is prepared by a similar procedure as ethyl tert-butyloxycarbonyl-L-prolyl-p-aminobenzoate from tert-butyloxycarbonyl-L-alanine and p-nitroaniline with the use of method "A" given in Example 4. Yield, 50% of the product, M.P. 172–3° C. (aqueous ethanol).

EXAMPLE 15

Amide of tert-butyloxycarbonyl-L-alanylsulfanilic acid (XIII)

The title amide is prepared by a similar procedure as ethyl tert-butyloxycarbonyl-L-prolyl-p-aminobenzoate from tert-butyloxycarbonyl-L-alanine and sulfanilamide with the use of method "B," given in Example 5. The yield of the crude product is almost quantitative; M. P. 188–190° C. (decomposition). Recrystallization from methanol affords 76% of the product, M.P. 200–205° C.

EXAMPLE 16

Ethyl pivaloyl-L-alanyl-p-aminobenzoate (XIV)

Pivaloyl chloride (1.26 ml.) and 1 N NaOH are simultaneously added drop by drop at 0° C. over 30 minutes to a stirred solution of L-alanine in 1 N NaOH (0.9 g. in 10 ml.). The stirring is continued for one hour at 0° C. and one hour at 20° C. The reaction mixture is washed with ether and the aqueous layer is acidified with dilute (1:1) hydrochloric acid to Congo red. The oil is extracted with ethyl acetate, the extract washed with water, and dried over sodium sulfate. The ethyl acetate is evaporated under diminished pressure and the residue triturated with petroleum ether to induce crystallization. Yield, 0.95 g. of pivaloyl-L-alanine, M.P. 130–132° C. Pivaloyl-L-alanine is then condensed with ethyl p-aminobenzoate with the use of method "B" (see Example 5), condensation of tert-butyloxycarbonyl - L - proline with ethyl p-aminobenzoate). The final product melts at 166–168° C. (ethanol).

EXAMPLE 17

Tert-butyloxycarbonyl-L-prolyl-p-methylaniline

The title compound is prepared by a similar procedure as ethyl tert-butyloxycarbonyl-L-prolyl-p-aminobenzoate from tert-butyloxycarbonyl-L-proline and p-toluidine with the use of method "A" given in Example 4. The recrystallized product melts at 179–180° C. (ethyl acetate).

EXAMPLE 18

Ethyl tert-butyloxycarbonyl-L-phenylalanyl-p-aminobenzoate

The title compound is prepared by a similar procedure as ethyl tert-butyloxycarbonyl-p-aminobenzoate from tert-butyloxycarbonyl-L-phenylalanine and ethyl p-aminobenzoate with the use of method "A" given in Example 4. After recrystallization from aqueous ethanol, the product melts at 140–142° C.

EXAMPLE 19

Tert-butyloxycarbonyl-L-alanyl-p-aminobenzoic acid

A solution of ethyl tert-butyloxycarbonyl-L-alanyl-p-aminobenzoate (0.6 g.) in acetone (3 ml.) is treated with 1 N NaOH (2 ml.) and allowed to stand at room temperature for 3 days. The reaction mixture is concentrated under diminished pressure and the concentrate is acidified with 10% aqueous citric acid. The precipitate is filtered with suction and washed with water. Yield, 0.51 g.; M.P. 185–195° C. Recrystallization from methanol affords product melting at 198–200° C.

EXAMPLE 20

Tert-butyloxycarbonyl-L-alanyl-3,4-methylenedioxyaniline

The title compound is prepared by a similar procedure as ethyl tert-butyloxycarbonyl-L-prolyl-p-aminobenzoate from tert-butyloxycarbonyl-L-alanine and 3,4-methylenedioxyaniline with the use of method "A" given in Example 4.

EXAMPLE 21

Methyl sec-butyloxycarbonyl-L-alanyl-p-aminobenzoate

Phosgene is introduced under stirring into a refluxing suspension of L-alanine methyl ester hydrochloride (30 g.) in dry toluene until the starting compound dissolves (for 3 hours). Excess phosgene is then removed by introduction of air. The toluene is evaporated under diminished pressure and the residue is fractionated. The fraction of carbonyl-L-alanine methyl ester (B.P. 60–61° C./15 mm. Hg; yield, 21.0 g.) is treated with anhydrous sec-butyl alcohol (150 ml.) and anhydrous pyridine (30 ml.), and the whole is refluxed for 2 hours. The reaction mixture is evaporated under diminished pressure and the oily residue is dissolved in petroleum ether. The insoluble solid is filtered off and the filtrate is concentrated under diminished pressure. The oily residue (23 g.) is dissolved in acetone (300 ml.) and 1 N NaOH (120 ml.), and the solution is allowed to stand at room temperature for 90 minutes. The acetone is evaporated under diminished pressure, the aqueous solution extracted with ethyl acetate, and acidified with 10% aqueous citric acid. The oil is extracted with ethyl acetate, the extract washed with water, dried over sodium sulfate, and evaporated under diminished pressure to afford 16.5 g. of sec-butyloxycarbonyl-L-alanine. Sec-butyloxycarbonyl-L-alanine is condensed with ethyl p-aminobenzoate with the use of method "A" (see Example 4) to afford ethyl sec-butylcarbonyl-L-alanyl - p - aminobenzoate, M.P. 123–126° C. (yield, 74%). The recrystallized product (yield, 61%) melts at 127–128° C. (ethyl acetate).

What is claimed is:

1. The compound, ethyl tert. - butyloxycarbonyl-L-prolyl-p-aminobenzoate.

2. The compound, ethyl pavolyl-L-ananyl-p-aminobenzoate.

3. The compound, ethyl tert.-butyloxycarbonyl-L-isoleucyl-p-aminobenzoate.

4. The compound, ethyl tert.-butyloxycarbonyl-DL-α-aminobutyryl-p-aminobenzoate.

5. The compound, ethyl tert. - butyloxycarbonyl - L-alanyl-p-aminobenzoate.

References Cited

UNITED STATES PATENTS

| | | | |
|---|---|---|---|
| 3,647,775 | 3/1972 | Marquarding et al. | 260—557 R |
| 3,164,614 | 1/1965 | Nicolaides et al. | 260—112.5 |

OTHER REFERENCES

Zaoral et al.: Science, 170, 92 (1970).

LEWIS GOTTS, Primary Examiner

R. J. SUYAT, Assistant Examiner

U.S. Cl. X.R.

260—293.73, 293.74, 293.77, 293.85, 293,86, 326.3, 397.7, 399, 404.5, 455 A, 471 R, 557 R, 558 R, 558 S, 558 A, 562 N, 562 S, 562 B